(12) United States Patent
Lee et al.

(10) Patent No.: US 10,936,137 B2
(45) Date of Patent: Mar. 2, 2021

(54) TOUCH SENSING DEVICE AND DISPLAY DEVICE INCLUDING THE SAME

(71) Applicant: SAMSUNG DISPLAY CO., LTD., Yongin-si (KR)

(72) Inventors: In Nam Lee, Yongin-si (KR); Jang Hui Kim, Suwon-si (KR); Sang Chul Lee, Yongin-si (KR); A Ra Jo, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/358,048

(22) Filed: Mar. 19, 2019

(65) Prior Publication Data

US 2019/0317626 A1 Oct. 17, 2019

(30) Foreign Application Priority Data

Apr. 13, 2018 (KR) .................. 10-2018-0043380

(51) Int. Cl.
*G06F 3/045* (2006.01)
*G06F 3/041* (2006.01)
*G06F 3/044* (2006.01)

(52) U.S. Cl.
CPC ............ *G06F 3/045* (2013.01); *G06F 3/0416* (2013.01); *G06F 3/0445* (2019.05); *G06F 3/0446* (2019.05)

(58) Field of Classification Search
CPC .. G06F 3/0416; G06F 3/04166; G06F 3/0445; G06F 3/0446; G06F 3/045
See application file for complete search history.

(56) References Cited

U.S. PATENT DOCUMENTS

| 9,158,407 | B2 | 10/2015 | Coulson et al. | |
|---|---|---|---|---|
| 2015/0115254 | A1* | 4/2015 | Choi | ............ H01L 27/323 257/40 |
| 2017/0315658 | A1* | 11/2017 | Vandermeijden | ....... G06F 3/044 |
| 2018/0095582 | A1* | 4/2018 | Hwang | ................ G06F 3/0416 |

FOREIGN PATENT DOCUMENTS

| JP | 3150179 | 4/2009 |
|---|---|---|
| KR | 10-1660600 | 9/2016 |
| KR | 10-2019-0125554 | 11/2019 |

* cited by examiner

*Primary Examiner* — Temesghen Ghebretinsae
*Assistant Examiner* — Sosina Abebe
(74) *Attorney, Agent, or Firm* — F. Chau & Associates, LLC

(57) ABSTRACT

A touch sensing device includes a first base layer, a plurality of first sensing electrodes disposed on the first base layer and spaced apart in a first direction, a plurality of second sensing electrodes disposed on a same layer as the first sensing electrodes and arranged in different rows from the first sensing electrodes, a plurality of third sensing electrodes on the second sensing electrodes that are spaced apart along a second direction different from the first direction and that overlap the second sensing electrodes, and a plurality of fourth sensing electrodes on the first sensing electrodes that are spaced apart along the second direction and that overlap the first sensing electrodes. At least two of the second sensing electrodes are directly connected to each other.

20 Claims, 11 Drawing Sheets

TOUCH SENSING DEVICE AND DISPLAY DEVICE INCLUDING THE SAME

This application claims priority under 35 U.S.C. § 119 from, and the benefit of, Korean Patent Application No. 10-2018-0043380, filed on Apr. 13, 2018 in the Korean Intellectual Property Office, the contents of which are herein incorporated by reference in their entirety.

BACKGROUND

1. Technical Field

Embodiments of the present disclosure are directed to a touch sensing device and a display device including the same.

2. Discussion of the Related Art

The importance of a display device has increased with the development of multimedia. Accordingly, various types of display devices, such as liquid crystal displays (LCD) or organic light emitting displays (OLED) have been used.

Among display devices, a liquid crystal display device is one of the most widely used flat panel display devices and includes two substrates with electric field generating electrodes, such as a pixel electrode and a common electrode, and a liquid crystal layer disposed therebetween. In a liquid crystal display device, a voltage is applied to the electric field generating electrodes to form an electric field in the liquid crystal layer, which changes the alignment of liquid crystal molecules in the liquid crystal layer, and controls the polarization of incident light, thereby displaying an image.

Further, among display devices, an organic light emitting, display deice displays an image using an organic light emitting element generating light by recombination of electrons and holes. An organic light emitting display device has a high response speed, high luminance, a wide viewing angle, and low power consumption.

Embodiments of the present disclosure provide a touch sensing device that can detect a touch position and a touch pressure through one module, and a display device that includes the input device.

Embodiments of the present disclosure provide a touch sensing device that can detect a touch pressure through a resistance sensing method, and a display device that includes the same.

According to an embodiment of the present disclosure, there is provided a touch sensing device. The touch sensing device includes a first base layer, a plurality of first sensing electrodes disposed on the first base layer that are spaced apart along a first direction, a plurality of second sensing electrodes disposed in a same layer as the first sensing electrodes and arranged in different rows from the first sensing electrodes, a plurality of third sensing electrodes disposed on the second sensing electrodes that are spaced apart along a second direction different from the first direction and that overlap the second sensing electrodes and a plurality of fourth sensing electrodes disposed on the first sensing electrodes that are spaced apart along the second direction and that overlap the first sensing electrodes. At least two of the second sensing electrodes are directly connected to each other.

In an exemplary embodiment, the touch sensing device further includes a Wheatstone bridge circuit unit electrically connected to a first strain gauge, and the at least two directly connected second sensing electrodes form the first strain gauge.

In an exemplary embodiment, at least two fourth sensing electrodes in different columns from each other are directly connected to each other. The at least two directly connected fourth sensing electrodes form a second strain gauge, and the second strain gauge is electrically connected to the Wheatstone bridge circuit unit.

In an exemplary embodiment, the first strain gauge overlaps the second strain gauge.

In an exemplary embodiment, the fourth sensing electrodes are floating electrodes.

In an exemplary embodiment, a ground voltage is transmitted to the third sensing electrodes in a touch pressure sensing mode.

In an exemplary embodiment, the first sensing electrodes and the second sensing electrodes are alternately arranged along the first direction.

In an exemplary embodiment, the touch sensing device further includes a second base layer on which the third sensing electrodes and the fourth sensing electrodes are disposed, and an insulating layer disposed between the first base layer and the second base layer and that covers the first sensing electrodes and the second sensing electrodes.

In an exemplary embodiment, the touch sensing device further includes a first touch pad unit disposed on the first base layer and connected to the first sensing electrodes and the second sensing electrodes through a plurality of first sensing lines, and a second touch pad unit disposed on the second base layer and connected to the third sensing electrodes and the fourth sensing electrodes through a plurality of second sensing lines.

According to an embodiment of the present disclosure, there is provided a display device. The display device includes a display panel, and a touch sensing panel disposed over the display panel. The touch sensing panel includes a plurality of first sensing electrodes spaced apart along a first direction, a plurality of second sensing electrodes disposed on a same layer as the first sensing electrodes and arranged in different rows from the first sensing electrodes, and a plurality of third sensing electrodes on the second sensing electrodes that are spaced apart along a second direction different from the first direction and that overlap the second sensing electrodes. Two of the second sensing electrodes are directly connected to each other and form a first strain gauge.

In an exemplary embodiment, the touch sensing panel further includes a Wheatstone bridge circuit unit electrically connected to the first strain gauge.

In an exemplary embodiment, another two of the second sensing electrodes are directly connected to each other and form a second strain gauge, and the second strain gauge is electrically connected to the Wheatstone bridge circuit unit.

In an exemplary embodiment, the touch sensing panel further includes a plurality of fourth sensing electrodes on the first sensing electrodes that are spaced apart along the second direction and that overlap the first sensing electrodes.

In an exemplary embodiment, two fourth sensing electrodes are connected to each other and form a third strain gauge, and the third strain gauge is electrically connected to the Wheatstone bridge circuit unit. The first strain gauge overlaps the third strain gauge.

In an exemplary embodiment, the fourth sensing electrodes are floating electrodes.

In an exemplary embodiment, the first sensing electrodes and the second sensing electrodes are alternately arranged along the first direction.

In an exemplary embodiment, the touch sensing panel further includes a first base layer disposed on the display panel and on which the first sensing electrodes and the second sensing electrodes are disposed, a second base layer on which the third sensing electrodes are disposed, and an insulating layer disposed between the first base layer and the second base layer and that covers the first sensing electrodes and the second sensing electrodes.

In an exemplary embodiment, the touch sensing panel further includes a first touch pad unit disposed on the first base layer and connected to the first sensing electrodes and the second sensing electrodes through a plurality of first sensing lines, and a second touch pad unit disposed on the second base layer and connected to the third sensing electrodes through a plurality of second sensing lines.

In an exemplary embodiment, a ground voltage is transmitted to the third sensing electrodes in a touch pressure sensing mode.

According to an embodiment of the present disclosure, there is provided a touch sensing device. The touch sensing device includes: a plurality of first sensing electrodes disposed on a substrate that are spaced apart along a first direction; a plurality of second sensing electrodes disposed on the substrate and arranged in different rows from the first sensing electrodes, wherein at least two of the second sensing electrodes are directly connected to each other and form a first strain gauge; a plurality of third sensing electrodes on the second sensing electrodes that spaced apart along a second direction different from the first direction and that overlap the second sensing electrodes; and a Wheatstone bridge circuit unit electrically connected to the first strain gauge.

Therefore, a touch sensing device and a display device can detect a touch position and a touch pressure through one module.

However, aspects of the present disclosure are not restricted to those set forth herein. The above and other aspects of embodiments of the present disclosure will become more apparent to one of ordinary skill in the art to which embodiments of the present disclosure pertain by referencing a detailed description of the present disclosure given below.

DETAILED DESCRIPTION OF EXEMPLARY EMBODIMENTS

Figure 1:
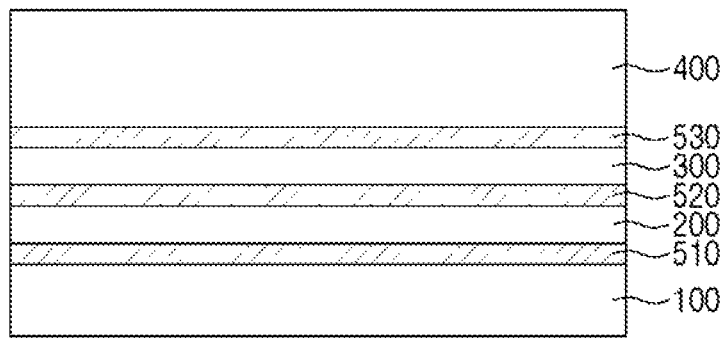
FIG. 1 is a cross-sectional view of a display device according to an embodiment of the present disclosure.

Features of embodiments of the disclosure and methods for achieving the features will be apparent by referring to exemplary embodiments to be described in detail with reference to the accompanying drawings. However, embodiments of the disclosure are not limited to exemplary embodiments disclosed hereinafter, but can be implemented in diverse forms.

Where an element is described as being related to another element such as being "on" another element or "located on" a different layer or a layer, includes both a case where an element is located directly on another element or a layer and a case where an element is located on another element via another layer or still another element. In the entire description of the disclosure, the same drawing reference numerals may be used for the same elements across various figures.

Throughout the specification, the same reference numerals may be used for the same or similar parts.

Hereinafter, embodiments of the present disclosure will be described with reference to the attached drawings.

FIG. 1 is a cross-sectional view of a display device according to an embodiment of the present disclosure.

A display device according to an embodiment of the present disclosure include a display panel 100, a touch or input sensing panel 200, an anti-reflection panel 300, and a window panel 400. In this specification, a configuration combined with another component through an adhesive member will be referred to as a "panel". Further, a configuration combined with another component through a continuous process will be referred to as a "layer". The panel includes a base layer that provides a base surface. In contrast, the layer may not include a base layer. That is, the term "layer" refers to a structure disposed on the base surface provided by another component. Here, in an embodiment, the base layer may include a synthetic resin film, a composite material film, a glass substrate, etc.

According to an embodiment, the display panel 100 displays an image. The display panel 100 may be an organic light emitting display panel, a liquid crystal display panel, a quantum dot display panel, etc.

According to an embodiment, the touch sensing panel 200 is disposed over the display panel 100. The display panel 100 and the touch sensing panel 200 are coupled to each other through a first adhesive member 510. The touch sensing panel 200 senses the position and pressure of a user's hand or a touch pen. That is, the touch sensing panel 200 can sense both the position and pressure of a touch. Details thereof will be described below. In addition, the touch sensing panel 200 can be referred to as a touch or input sensing device before it is attached to the display panel 200.

According to an embodiment, the anti-reflective panel 300 is disposed over the touch sensing panel 200. The anti-reflective panel 300 and the touch sensing panel 200 are coupled to each other through a second adhesive member 520. The anti-reflective panel 300 reduces the reflectance of external light incident from above the window panel 400. The anti-reflective panel 300 includes a retarder and a polarizer. Further, the anti-reflective panel 300 includes a black matrix and a color filter. The anti-reflective panel 300 may be omitted.

According to an embodiment, the window panel 400 is disposed over the anti-reflective panel 300. The window panel 400 and the anti-reflective panel 300 are coupled to each other through a third adhesive member 530. The window panel 400 protects the display panel 100 or the touch sensing panel 200 from external scratches, etc.

In an embodiment, each of the first to third adhesive members 510 to 530 may be a pressure-sensitive adhesive (PSA) member, an optical clear adhesive (OCA) member, or an optical clear resin (OCR) film. Unlike above, at least one of the touch sensing panel 200, the anti-reflection panel 300, and the window panel 400 can be a "layer" having an upper make of another component as a base layer. For example, the touch sensing panel 200 can be formed as a touch sensing layer having an upper surface of the display panel 100 as a base surface. That is, the touch sensing layer can be formed together with the display panel 100 through a continuous process.

Hereinafter, the touch sensing panel 200 will be described in more detail.

Figure 2:
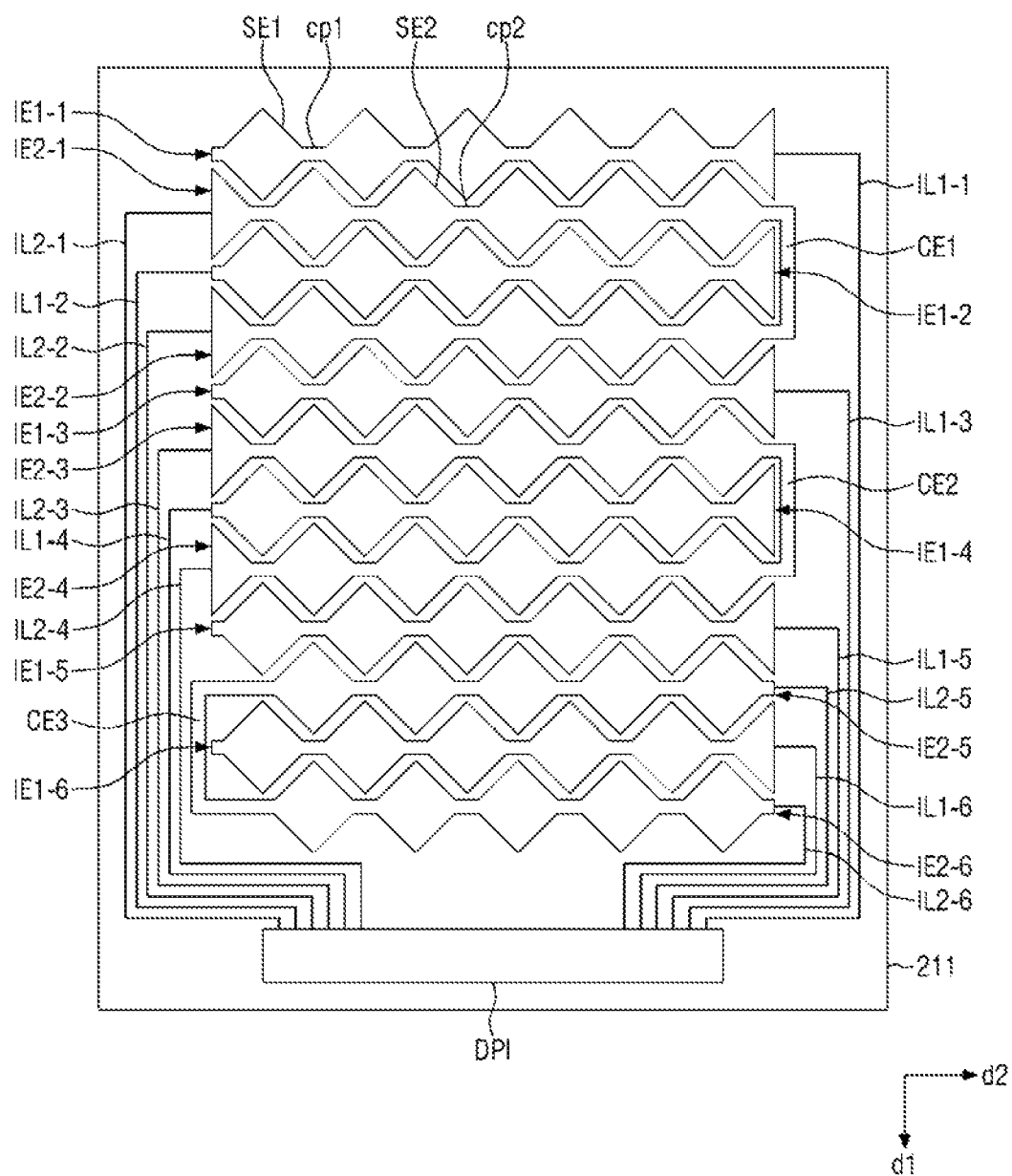
FIG. 2 is a plan view of a first substrate of a touch sensing panel shown in FIG. 1.
Figure 3:
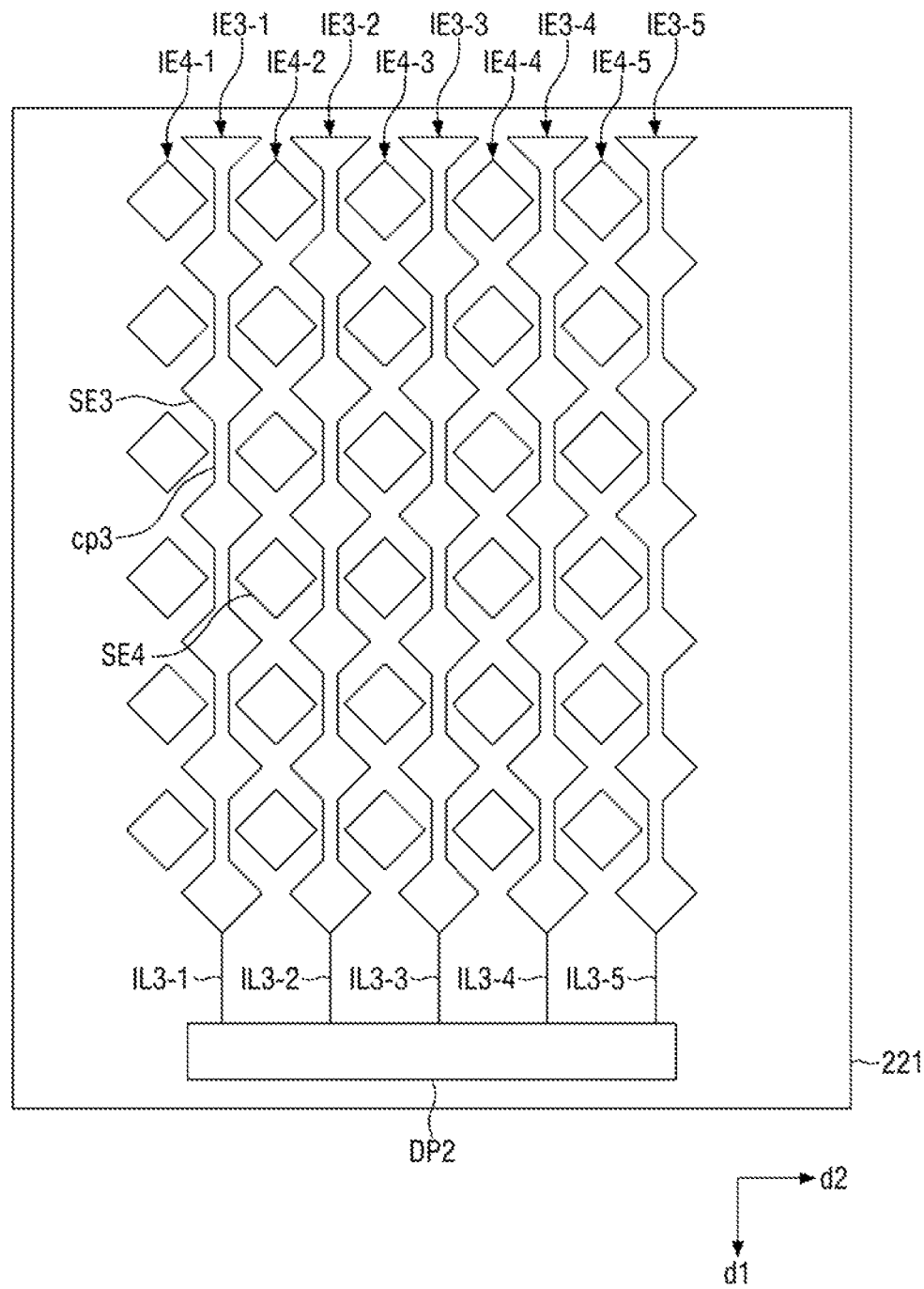
FIG. 3 is a plan view of a second substrate of the touch sensing panel shown in FIG. 1.
Figure 4:
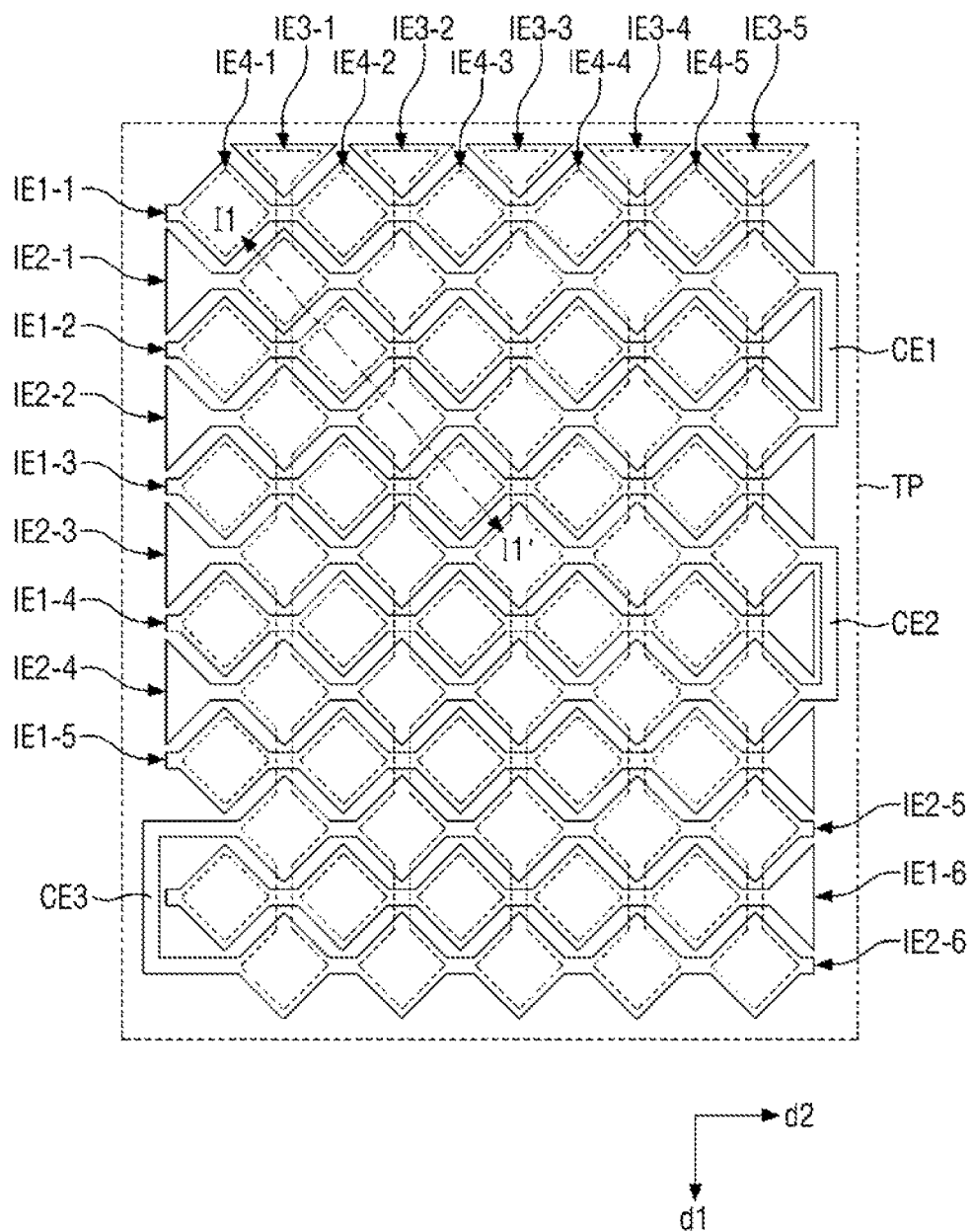
FIG. 4 is a plan view of a touch area between the first substrate and the second substrate shown in FIGS. 2 and 3.
Figure 5A:
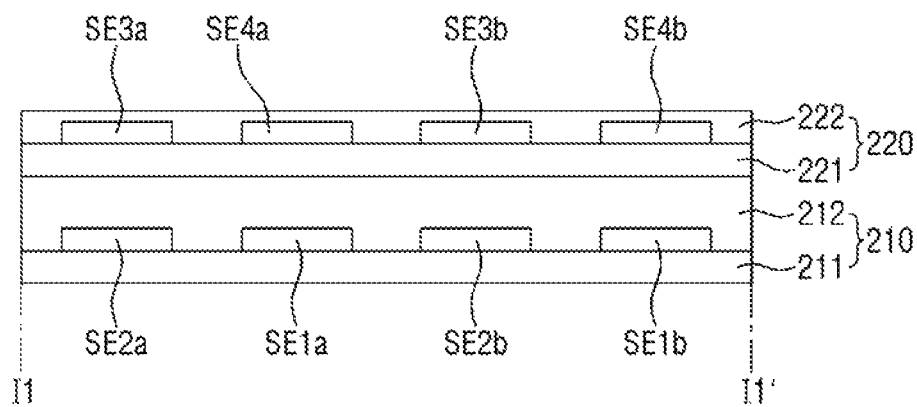
FIG. 5A is a cross-sectional view taken along the line II-II' in FIG. 4.
Figure 5B:
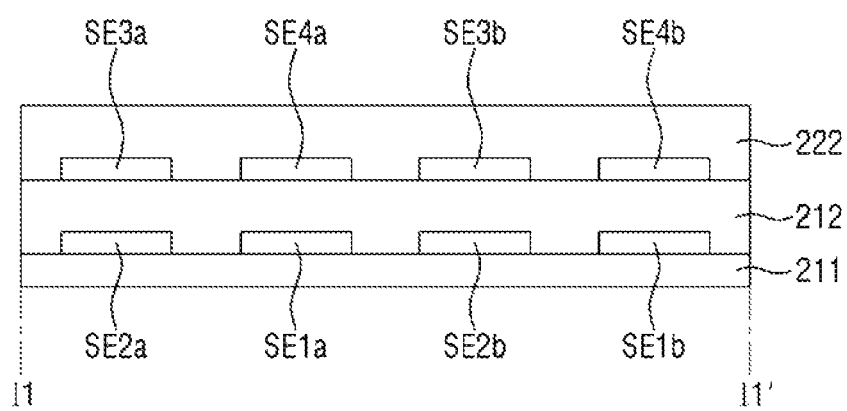
FIG. 5B is another cross-sectional view taken along the line II-II' in FIG. 4.

FIG. 2 is a plan view of a first substrate of a touch sensing panel shown in FIG. 1. FIG. 3 is, a plan view of a second substrate of a touch sensing panel shown in FIG. 1. FIG. 4 is a plan view of a touch area between the first substrate and the second substrate shown its FIGS. 2 and 3. FIG. 5A is a cross-sectional view taken along the line it FIG. 4. FIG. 5B is another cross-sectional view taken along the line in FIG. 4. In addition, for convenience of explanation, although FIG. 4 shows that the size of a sensing electrode provided in a second substrate 220 is smaller than the size of a sensing electrode provided in a first substrate 210, the size of an actual sensing electrode is not limited thereto.

Referring to FIGS. 2 to 5, according to an embodiment, a touch sensing panel 200 may include a first substrate 210 and a second substrate 220.

Hereinafter, the first substrate 210 will be described first.

According to an embodiment, the first substrate 210 is disposed on the display panel 100, and is coupled to the upper surface of the display panel 100 through the first adhesive member 510, as shown in FIG. 1. The first substrate 210 includes a first base layer 211, a plurality of first sensing electrodes IE1-1 to IE1-6, a plurality of second sensing electrodes IE2-1 to IE2-6, a plurality of first signal lines IE1-1, to IE1-6, a plurality of second signal lines IE2-1 to IE2-6, a first touch pad unit DP1, and a first insulating layer 212. Here, reference numerals of each of the first sensing electrodes IE1-1 to IE1-6 and the second sensing electrodes IE2-1 to IE2-6 refer to the row in which it is disposed.

According to an embodiment, the first base layer 211 provides a base surface to the first sensing electrodes IE1-1 to IE1-6, the second sensing electrodes IE2-1 to IE2-6, the first signal lines IL1-1 to IL1-6, and the second signal lines IL2-1 to IL2-6. The first base layer 211 may be a synthetic resin film, a glass substrate, an organic/inorganic composite material substrate, etc. The base layer 211 may be a single layer, or may have a plurality of layers attached to each other with adhesive members, etc.

According to an embodiment, the first sensing electrodes IE1-1 to IE1-6 are arranged on the first base layer 211 along a first direction d1. That is, the first sensing electrodes IE1-1 to IE1-6 are spaced apart from each other in the first direction d1 and arranged in different rows. Each of the first sensing electrodes IE1-1 to IE1-6 includes a plurality of first sensing units SE1 and a plurality of first connection units cp1. Here, the first sensing units SE1 are spaced apart along a second direction d2 that intersects the first direction d1 and are connected to each other through the first connection units cp1. Referring to FIG. 2, the first direction d1 is a column direction, and the second direction d2 is a row direction.

According to an embodiment, the first sensing electrodes IE1-1 to IE1-6 are connected to the first touch pad unit DP1 through the first signal lines IL1-1 to IL1-6, respectively. The first touch pad unit DP1 is electrically connected to a touch driving circuit through a flexible substrate. Thus, the first sensing electrodes IE1-1 to IE1-6 receive a driving signal from the touch driving circuit through the first signal lines IL1-1 to IL1-6.

According to an embodiment, the second sensing electrodes IE2-1 to IE2-6 are disposed on the first base layer 211 along the first direction d1. The second sensing electrodes IE2-1 to IE2-6 are disposed on the same layer as the first sensing electrodes IE1-1 to IE1-6, and are insulated from each other. The first sensing electrodes IE1-1 to IE1-6 and the second sensing electrodes IE2-1 to IE2-6 are staggered along the first direction d1. Each of the second sensing electrodes IE2-1 to IE2-6 includes a plurality of second sensing units SE2 and a plurality of second connection units cp2. Here, the second sensing units SE2 are spaced apart along the second direction d2, and are connected to each other through the second connection units cp2.

According to an embodiment, the second sensing electrodes IE2-1 to IE2-6 are connected to the first touch pad unit DP1 through the second signal lines IL2-1 to IL2-6, respectively. The first touch pad unit DP1 includes a plurality of pad units spaced apart along the second direction d2. The pad units are connected to the first signal lines IL1-1 to IL1-6 and the second signal lines IL2-1 to IL2-6, respectively.

According to an embodiment, at least two sensing electrodes of the second sensing electrodes IE2-1 to IE2-6 are connected to each other through a connection electrode. For example, the second sensing electrode IE2-1 and the second sensing electrode IE2-2, which are in different rows, are directly connected to each other through a first connection electrode CE1. Thus, the second sensing electrode IE2-1 and the second sensing electrode IE2-2 are directly connected to each other to form a strain gauge.

According to an embodiment, the position of the connecting electrode is not particularly limited. That is, the connection electrode may be disposed on the other side of the first connection electrode CE1 and the second connection electrode CE2, like a third connection electrode CE3 that directly connects the second sensing electrode IE2-5 and the second sensing electrode IE2-6. In addition, second sensing electrodes that are not adjacent to each other can be directly connected to each other to form a strain gauge. According to an embodiment, it is assumed that adjacent second sensing electrodes are directly connected to each other to form a strain gauge. The strain gauge is connected to a wheat stone bridge to be described below. Touch pressure can be measured through a resistance change of the strain gauge. Details thereof will be described below.

According to an embodiment, the first touch pad unit DP1 is electrically connected to a touch driving circuit through a separate first flexible substrate. Therefore, the second sensing electrodes IE2-1 to IE2-6 receive driving signals from the touch driving circuit through the second signal lines IE2-1 to IE2-6 and the first touch pad unit DP1.

In an embodiment, each of the first sensing units SE1 and the second sensing units SE2 has a rhombic shape. Here, the rhombic shape includes not only a substantially rhombic shape but also a polygonal shape close to rhombus, depending on process conditions, etc. However, embodiments of the present disclosure are not limited thereto, and each of the first sensing units SE1 and the second sensing units SE2 may have a polygonal shape, or may have a shape that does not distinguish between a sensor unit and a connection unit, such as a bar shape.

According to an embodiment, the arrangement of the first signal lines IL1-1 to IL1-6 and the second signal lines IL2-1 to IL2-6 on the first base layer 211 is not limited to those shown in FIGS. 2 and 3. In other embodiments, the first signal lines (IL1-1 to IL1-6) and the second signal lines (IL2-1 to IL2-6) may be disposed on the same side surface.

According to an embodiment, the first insulating layer 212 is disposed on the first sensing electrodes IE1-1 to IE1-6, the second sensing electrodes IE2-1 to IE2-6, the first signal lines IL1-1 to IL1-6, and the second signal lines IL2-1 to IE2-6. The first insulating layer 212 may be a single-layer structure or a multi-layer structure. The first insulating layer 212 is formed of an elastic material having a high dielectric constant. The first insulating layer 212 may be formed of an acrylic, polyurethane, or polydimethylsiloxane (PDMS). The first insulating layer 212 may also be formed of another elastic material having a high dielectric constant. Further, the first insulating layer 212 may be formed of an adhesive material. In this case, the first substrate 210 and the second substrate 220 are coupled to each other through the first insulating layer 212. A separate adhesive layer may be formed between the first substrate 210 and the second substrate 220.

Next, the second substrate 220 will be described.

According to an embodiment, the second substrate 220 includes a second base layer 221, a plurality of third sensing electrodes IE3-1 to IE3-5, a plurality of fourth sensing electrodes IE4-1 to IE4-5, a plurality of third signal lines IL3-1 to IL3-5, a second touch pad unit DP2, and a second insulating layer 222. Here, reference numerals of each of the third sensing electrodes IE3-1 to IE3-5 and the fourth sensing electrodes IE4-1 to IE4-5 refer to the column in which it is disposed.

According to an embodiment, the second base layer 221 provides a base surface to the third sensing electrodes IE3-1 to IE3-5, the fourth sensing electrodes IE4-1 to IE4-5, and the third signal lines IL3-1 to IL3-5. The second base layer 221 is formed of the same material as that of the first base layer 211.

According to an embodiment, the third sensing electrodes IE3-1 to IE3-5 are arranged on the second base layer 221 along the second direction d2. That is, the third sensing electrodes IE3-1 to IE3-5 are arranged in different columns spaced apart in the second direction d2. Each of the third sensing electrodes IE3-1 to IE3-5 includes a plurality of third sensing units SE3 and a plurality of third connection, units cp3. Here, the third sensing units SE3 are spaced apart in the first direction d1, and are connected to each other through the third connection units cp3.

According to an embodiment, the third sensing electrodes IE3-1 to IE3-5 are connected to the second touch pad unit DP2 through the third signal lines IL3-1 to IL3-5, respectively. The second touch pad unit DP2 includes a plurality of pad units spaced apart in the second direction d2. The pad units are connected to the third signal lines IL3-1 to IL3-5, respectively. The second touch pad unit DP2 receives a driving signal from a touch driving circuit through a second flexible substrate. That is, the third sensing electrodes IE3-1 to IE3-5 receive a driving signal from the touch driving circuit through the third signal lines IL3-1 to IL3-5 and the second touch pad unit DP2.

According to an embodiment, the fourth sensing electrodes IE4-1 to IE4-5 are spaced apart on the second base layer 221 along the first direction d1. The fourth sensing electrodes IE4-1 to IE4-5 are insulated from the third sensing electrodes IE3-1 to IE3-5. The fourth sensing electrodes IE4-1 to IE4-5 include a plurality of fourth sensing units SE4, respectively. However, the fourth sensing electrodes IE4-1 to IE4-5 do not include connection units that connect the sensing units to each other. That is, the fourth sensing units SE4 have an island shape in which the fourth sensing units SE4 are not connected to each other. Accordingly, the fourth sensing units SE4 have a floating state.

In an embodiment, each of the third sensing units SE3 and the fourth sensing units SE4 has a rhombic shape. However, embodiments of the present disclosure are not limited thereto. The first to fourth sensing units SE1 to SE4 may differ from each other in shape, and may also differ from each other in size. The arrangement of the third signal lines IL3-1 to IL3-5 on the second base layer 221 is not limited to that shown in FIG. 3.

According to an embodiment, the second insulating layer 222 is disposed on the third sensing electrodes IE3-1 to IE3-5, the fourth sensing electrodes IE4-1 to IE4-5, and the third signal lines IL3-1 to IL3-5. The second insulating layer 222 may be a single-layer structure or a multi-layer structure. The second insulating layer 222 may be formed of an inorganic material, an organic material, or a composite material. A second adhesive member 520 is disposed on the second insulating layer 222. In another embodiment, the second insulating layer 222 is formed of the same material as the first insulating layer 212. However, when the second insulating layer 222 includes an adhesive material, the second adhesive member 520 can be omitted.

According to an embodiment, the first sensing electrodes IE1-1 to IE1-6, the second sensing electrodes IE2-1 to IE2-6, the third sensing electrodes IE3-1 to IE3-5, and the fourth sensing electrodes IE4-1 to IE4-5 are arranged in a touch area TP, shown FIG. 4. Here, the touch area TP overlaps a display area for displaying an image on the display panel 100.

In an embodiment, the first sensing electrodes IE1-1 to IE1-6, the second sensing electrodes IE2-1 to IE2-6, the third sensing electrodes IE3-1 to IE3-5, the fourth sensing electrodes IE4-1 to IE4-5, the first signal lines IL1-1 to IL1-6, and the second signal lines IL2-1 to IL2-6 are formed of a transparent or translucent conductive material. Here, the transparent translucent conductive material includes at least one selected from indium tin oxide (ITO), indium zinc oxide (IZO), zinc oxide (ZnO), indium oxide ($In_2O_3$), indium gallium oxide (IGO), or aluminum zinc oxide (AZO).

Next, an overlapping relationship between the sensing electrodes will be described.

According to an embodiment, the third sensing electrodes IE3-1 to IE3-5 overlap the second sensing electrodes IE2-1 to IE2-6. Further, the fourth sensing electrodes IE4-1 to IE4-5 overlap the first sensing electrodes IE1-1 to IE1-6.

An example according to an embodiment will be described with reference to FIG. 5A. The first sensing unit SE1$a$ and the first sensing unit SE1$b$ are two adjacent sensing units of the first sensing electrodes IE1-1 to IE1-6. The second sensing unit SE2$a$ and the second sensing unit SE2$b$ are two adjacent sensing units of the second sensing electrodes IE2-1 to IE2-6. Further, the third sensing unit SE3a and the third sensing unit SE3b are two adjacent sensing units of the third sensing, electrodes IE3-1 to IE3-5, and the fourth sensing unit SE4a and the fourth sensing unit SE4b are two adjacent sensing units of the fourth sensing, electrodes IE4-1 to IE4-5.

That is, according to an embodiment, the first sensing units SE1a and SE1b overlap the fourth sensing units SE4a and SE4b respectively. Further, the second sensing units SE2a and SE2b overlap the third sensing units SE3a and SE3b, respectively.

According to an embodiment, the size of each sensing unit is not particularly limited. The sizes of the third sensing units SE3a and SE3b and the fourth sensing units SE4a and SE4b is greater than the sizes of the first sensing units SE1a and SE1b and the second sensing unit SE2a and SE2b. That is, the sizes of the upper sensing units are increased to secure a predetermined tolerance. Accordingly, it is possible to minimize a misalignment that can occur when the first substrate 210 and the second substrate 220 are attached together.

According to an embodiment unlike that shown in FIG. 5A, the third sensing electrodes to IE3-5, the fourth sensing electrodes IE4-1 to IE4-5, and the third signal lines IL3-1 to IL3-5 can be directly arranged on the first insulating layer 212. Thus, referring to FIG. 5B, the second base layer 221 shown in FIG. 5A is omitted.

Further, according to an embodiment, unlike those shown in FIGS. 5A and 5B, the first sensing electrodes IE1-1 to IE1-6, the second sensing electrodes IE2-1 to IE2-6, the first signal lines IL1-1 to IL1-6, and the second signal lines IL2-1 to IL2-6 can be directly formed on the upper surface of the display panel 100. In this case, the first base layer 211 shown in FIGS. 5A and 5B is replaced with the upper surface of the display panel 100.

Hereinafter, a method of sensing a touch position in a display device according to an embodiment of the present disclosure will be described.

Figure 6:
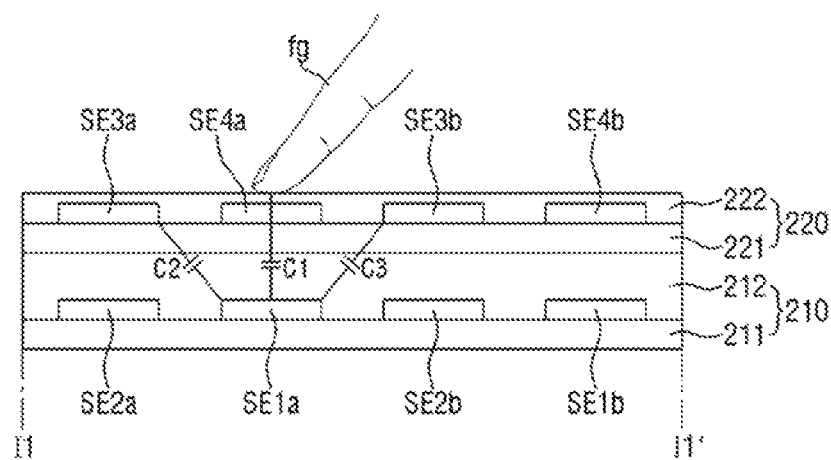
FIG. 6 is a cross-sectional view that illustrates a method of sensing a touch position in a display device according to an embodiment of the present disclosure.

FIG. 6 is a cross-sectional view that illustrates a method of sensing a touch position in a display device according to an embodiment of the present disclosure. For convenience of explanation, in FIG. 6, the method will be described with reference to a cross-section taken along the line II-II' shown in FIG. 4.

According to an embodiment, the first sensing electrodes IE1-1 to IE1-6 operate as sensing electrodes Rx when sensing a touch position. The third sensing electrodes IE3-1 to IE3-5 operate as driving electrodes Tx when sensing the touch position. That is, when sensing a touch position, the first sensing units SE4a and SE4b operate as sensing electrodes, and the third sensing units SE3a and SE3b operate as driving electrodes.

According to an embodiment, the fourth sensing electrodes IE4-1 to IE4-5 operate as floating electrodes when sensing a touch position. However, the second sensing electrodes IE2-1 to IE2-6 are not utilized for sensing a touch position. That is, when sensing a touch position, the fourth sensing units SE4a and SE4b operate as floating electrodes, whereas the second sensing units SE2a and SE2b are not utilized. That is, the second sensing units SE2a and SE2b operate as dummy electrodes which are not utilized for sensing a touch position.

An example will be described. A first capacitor C1 is formed between the first sensing unit SE1a operating as a sensing electrode and the fourth sensing unit SE4a operating as a floating electrode. Further, a second capacitor C2 is formed between the first sensing unit SE1a and the third sensing unit SE3a, and a third capacitor C3 is formed between the first sensing unit SE1a and the third sensing unit SE3b.

According to an embodiment, the capacitances of the first to third capacitors C1 to C3 change due to a touch by a conductive object, such as a touch by a user's finger fg. The position of the user's touch is sensed by detecting a change of the capacitance.

As described above, according to an embodiment, the second sensing electrodes IE2-1 to IE2-6 overlap the third sensing electrodes IE3-1 to IE3-5, and the fourth sensing electrodes IE4-1 to IE4-5 overlap the first sensing electrodes IE1-1 to IE1-6. Accordingly, when sensing a touch position, the second sensing electrodes IE2-1 to IE2-6 and the fourth sensing electrodes IE4-1 to IE4-5 prevent the pattern shapes of the first sensing electrodes IE1-1 to IE1-6 and the third sensing electrodes IE3-1 to IE3-5 from being visually recognized.

Next, a method of sensing a touch position will be described with reference to FIGS. 2 and 7.

Figure 7:
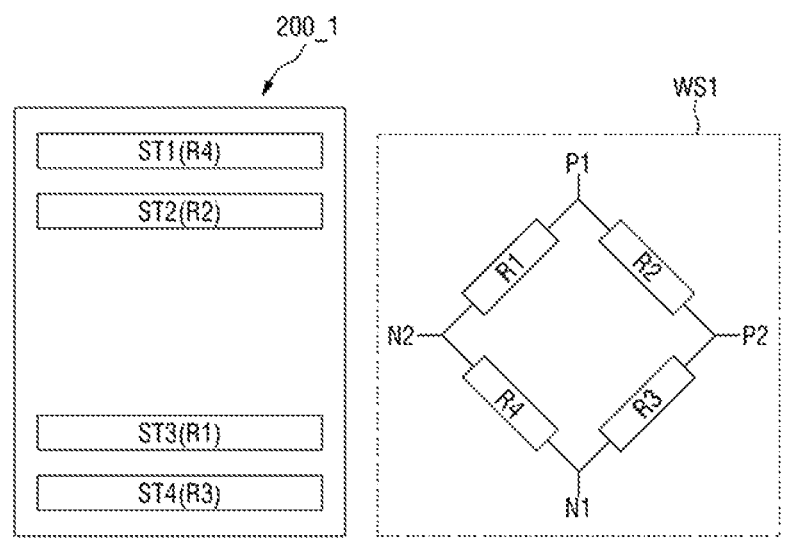
FIG. 7 illustrates a method of sensing a touch pressure in a display device according to an embodiment of the present disclosure.

FIG. 7 illustrates a method of sensing a touch pressure in a display device according to an embodiment of the present disclosure.

According to an embodiment, a display device according to an embodiment of the present disclosure can measure the touch, pressure of a user through a resistance sensing method. This will be described in more detail. As described above, the second sensing electrodes that are directly connected to each other form a strain gauge. For example, referring to FIG. 2, the second sensing electrodes IE2-1 and IE2-2 directly connected by the first connection electrode CE1 form a strain gauge. Further, the second sensing electrodes IE2-3 and IE2-4 directly connected by the second connection electrode CE2 form another strain gauge.

Although three strain gauges are shown in FIG. 2, embodiments of the present disclosure are not limited thereto. That is, a plurality of strain gauges can be formed on the first base layer 211. A display device according to an embodiment of the present disclosure can sense a touch pressure through the strain gauges. Hereinafter, first to fourth strain gauges ST1 to ST4 will be described as an example.

Referring to FIG. 7, according to an embodiment, the first and second strain gauges ST1 and ST2 are disposed at the upper side of the first base layer 211, and the third and fourth strain gauges ST3 and ST4 are disposed at the lower side of the first base layer 211. Each of the first to fourth strain gauges ST1 to ST4 corresponds to one resistor of a first Wheatstone bridge circuit unit WS1.

More specifically, according to an embodiment, the first strain gauge ST1 serving as a fourth resistor R4, the second strain gauge ST2 serving as a second resistor R2, the third strain gauge ST3 serving as a first resistor R1, and the fourth strain gauge ST4 serving as a third resistor R3 form the first Wheatstone bridge circuit unit WS1. In addition, each of the first power source P1 and the second power source N1 of the first Wheatstone bridge circuit unit WS1 may receive an externally supplied voltage. Here, in an embodiment, the second power source N2 receives a ground voltage.

According to an embodiment, one end of the first resistor R1 is connected to the first power source P1, and the other end thereof is connected to a third power source N2. One end of the second resistor R2 is connected to the first power source P1, and the other end thereof is connected to a fourth power source P2. One end of the third resistor R3 is connected to the fourth power source P2, and the other end thereof is connected to the second power source N1. One end of the fourth resistor R4 is connected to the third power source N2, and the other end thereof is connected to the second power source N1. Here, the potential difference between the third power source N2 and the fourth power source P2 is 0 V, so that no current flows between the third power source N2 and the fourth power source P2.

Thereafter, according to an embodiment, when the user touches a touch sensing panel 200_1, more specifically, a part of an area where the first to fourth strain gauges ST1 to ST4 are arranged, some of the resistances corresponding to the first to fourth strain gauges ST1 to ST4 change. More specifically, in the first to fourth strain gauges ST1 to ST4, an electrode length is increased by the external pressure, and thus the corresponding resistance value changes.

According to an embodiment, due to the change in resistance, a voltage difference is generated between the third power source N2 and the fourth power source P2, thus generating a current corresponding to the voltage difference. The touch pressure of a user is detected by measuring the voltage difference or the amount of current. In an embodiment, the aforementioned touch driving circuit detects the touch pressure of the user based on measuring the voltage difference or the amount of current.

The position of the first Wheatstone bridge circuit unit WS1 is not particularly limited. In an embodiment, the first Wheatstone bridge circuit unit WS1 is disposed in an area that overlaps the non-display area of the display panel 100 where no image is displayed.

In FIG. 7, according to an embodiment, the first to fourth strain gauges ST1 to ST4 form the first Wheatstone bridge circuit unit WS1, but embodiments of the present disclosure are not limited thereto. That is, the first Wheatstone bridge circuit unit WS1 can be formed by strain gauges disposed in an area where pressure detection of the user is required. An example will be described with reference to FIG. 8.

Figure 8:
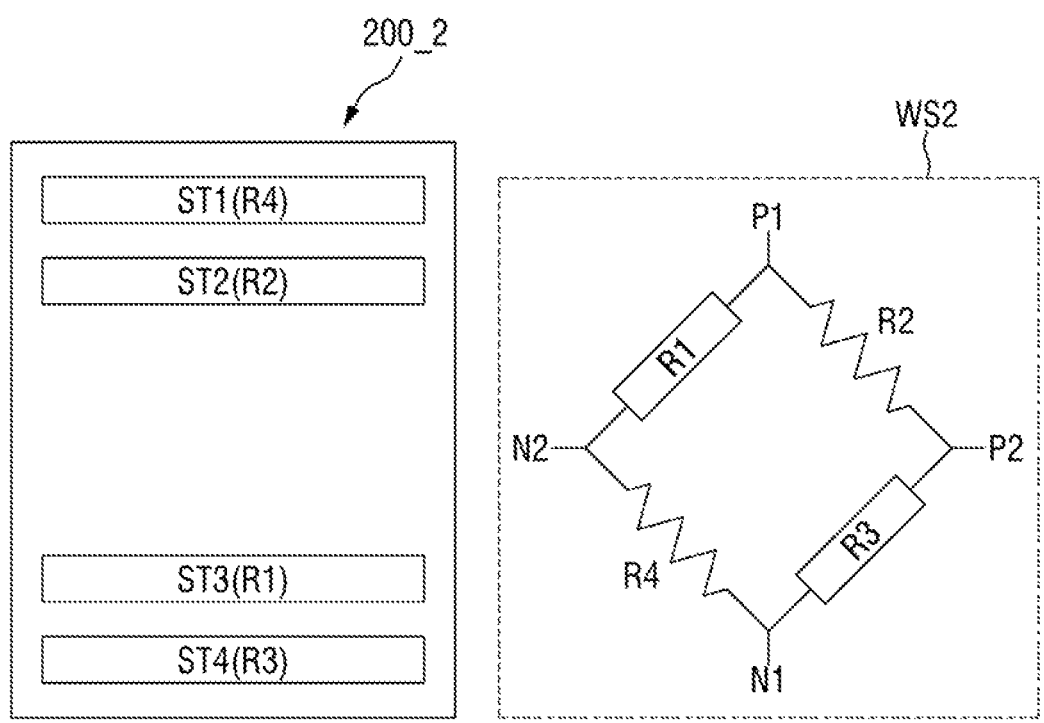
FIG. 8 illustrates a method of sensing a touch pressure in a display device according to an embodiment of the present disclosure.

FIG. 8 illustrates a method of sensing a touch pressure in a display device according to another embodiment of the present disclosure. A second Wheatstone bridge circuit unit WS2 shown in FIG. 8 formed in a touch sensing panel 200_2 differs from the first Wheatstone bridge circuit unit. WS1 shown in FIG. 7 in that two strain gauges and two fixed resistors are used.

For example, according to an embodiment, the second Wheatstone bridge circuit unit WS2 is formed by the third strain gauge ST3, the fourth strain gauge ST4, the second resistor R2, and the fourth resistor R4. Here, the resistance values of the second resistor R2 and the fourth resistor R4 do not change. The voltage difference between the third power source N2 and the fourth power source P2 or the amount of current is measured through the resistance changes of the third strain gauge ST3 and the fourth strain gauge ST4 disposed at the lower side of the touch sensing panel 200_2, thereby detecting the touch pressure of a user.

According to embodiments, unlike those shown in FIGS. 7 and 8, a plurality of Wheatstone bridge circuit units can be formed. That is, the number of the Wheatstone bridge circuit units, the number of strain gauges that form each Wheatstone bridge circuit unit, the position of the strain gauges, the number of fixed resistors, etc., vary depending on the area where the touch pressure of a user needs be detected.

That is, according to an embodiment, a display device according to an embodiment of the present disclosure can detect both the touch position and the touch pressure by using the touch sensing panel 200. The touch sensing panel 200 senses the touch position or the touch pressure by performing time-division driving depending on a touch position sensing mode or a touch pressure sensing mode.

That is, the driving signal for touch position sensing and the driving signal for touch pressure sensing are time-divided, so that noise between respective sensors can be minimized, and the sensing accuracy of the sensors can be improved. In an embodiment, the driving signal for touch position sensing is transmitted first, and then, the driving signal for touch pressure sensing is transmitted.

In addition, according to an embodiment, since a display device according to an embodiment of the present disclosure can sense both the touch position and the touch pressure through one touch sensing panel 200, a separate external pressure sensor can be eliminated. Thus, the total thickness of a display device can be reduced. Further, since the pressure sensor can be formed over an entire area of a display area, it is possible to increase a user's convenience.

Figure 9:
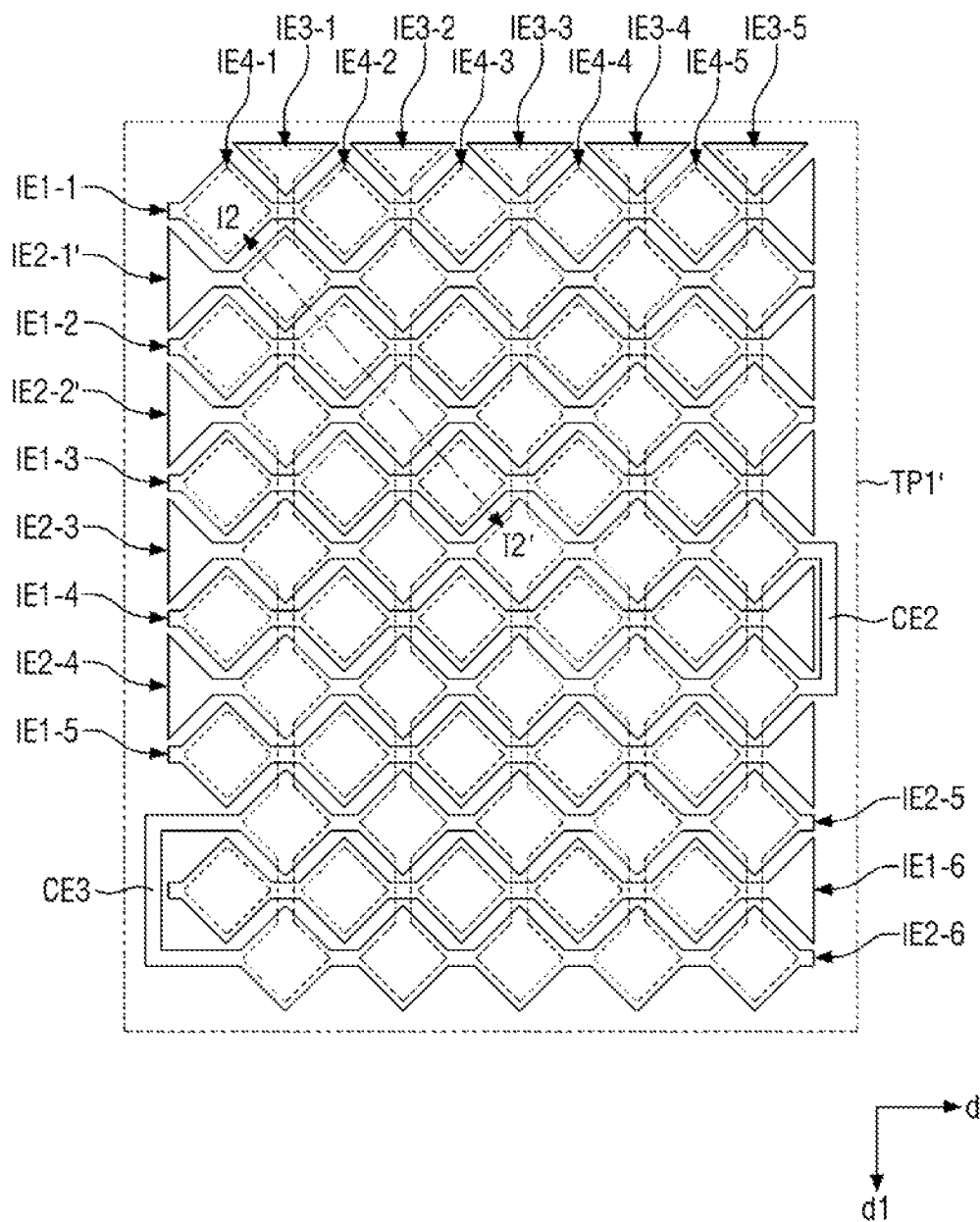
FIGS. 9 and 10 illustrate a method of sensing a touch pressure through a capacitance change in a display device according to an embodiment of the present disclosure.
Figure 10:
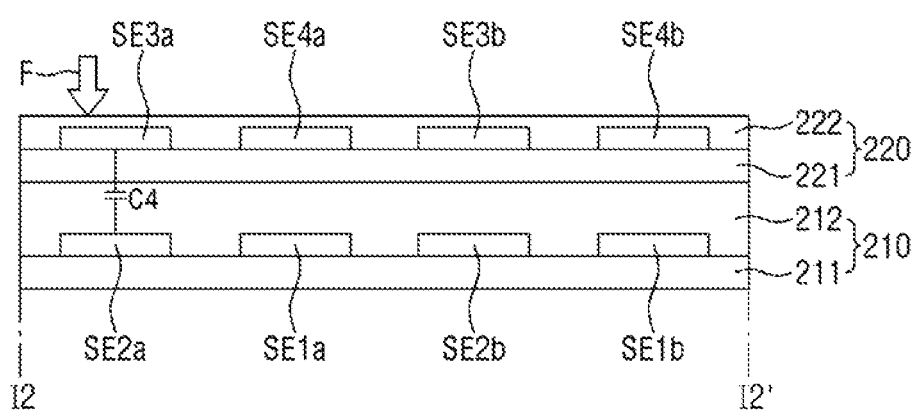

FIGS. 9 and 10 illustrate a method of sensing a touch pressure through a capacitance change in a display device according to an embodiment of the present disclosure. A repeated description of components having been described with reference to FIGS. 1 to 8 will be omitted.

According to an embodiment, the touch area TP1' shown in FIG. 9 differs from the touch area TP shown in FIG. 4 in that the second sensing electrodes IE2-1 and IE2-2 are not connected to each other.

Accordingly, in an embodiment, a user's touch pressure can be detected by a capacitance change of at least one of the second sensing electrodes IE2-1 and IE2-2. This will be described in more detail with reference to the second sensing unit SE2a and the third sensing unit SE3a of FIG. 10.

According to an embodiment, driving signals for touch pressure detection are transmitted to the second sensing unit SE2a of the first substrate 210 and the third sensing unit SE3a of the second substrate 220. Here, a ground voltage is transmitted to the third sensing unit SE3a of the second substrate 220. Thus, a fourth capacitor C4 forms between the second sensing unit SE2a and the third sensing unit SE3a.

That is, according to an embodiment, the touch driving circuit transmits the driving signals for touch pressure detection to the second sensing unit SE2a of the first substrate 210 and the third sensing unit SE3a of the second substrate 220, and senses a change in capacitance of the fourth capacitor C4 when a touch pressure F is applied. Therefore, the touch pressure can be detected.

In addition, according to an embodiment, the second sensing electrodes IE2-3 to IE2-6 form strain gauges through the second and third connection electrodes CE2 and CE3. A Wheatstone bridge circuit unit is formed using at least one of the strain gauges, thereby detecting the touch pressure using the resistance change.

That is, according to an embodiment, for a display device shown in FIGS. 9 and 10, it is possible to detect a touch pressure using, changes in capacitance and resistance. However, areas where pressure is detected by a capacitance change and where pressure is detected by a resistance change are not limited to those shown in FIGS. 9 and 10.

Figure 11:
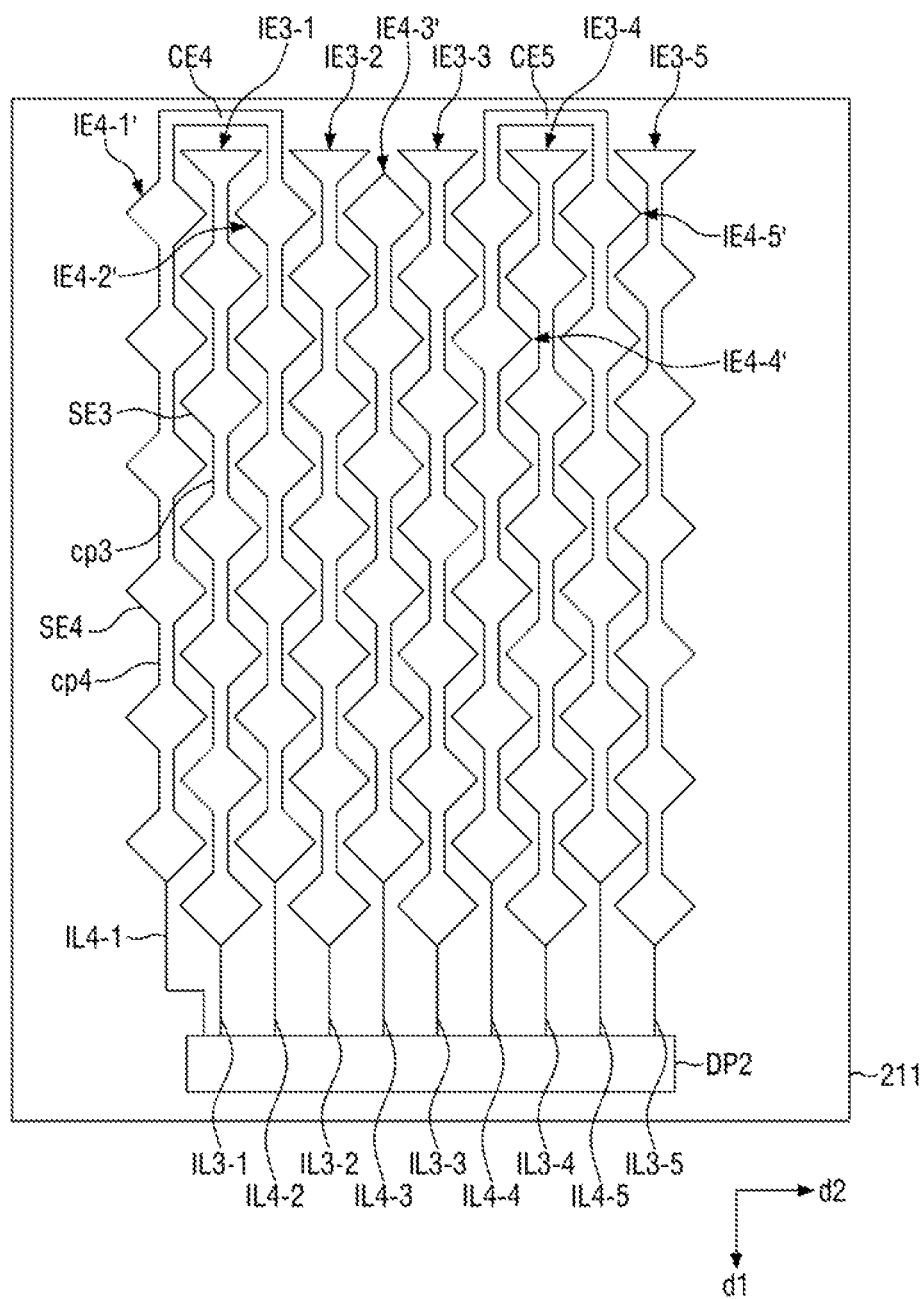
FIGS. 11 to 13 illustrate a method of sensing a touch pressure in a display device according to an embodiment of the present disclosure.
Figure 12:
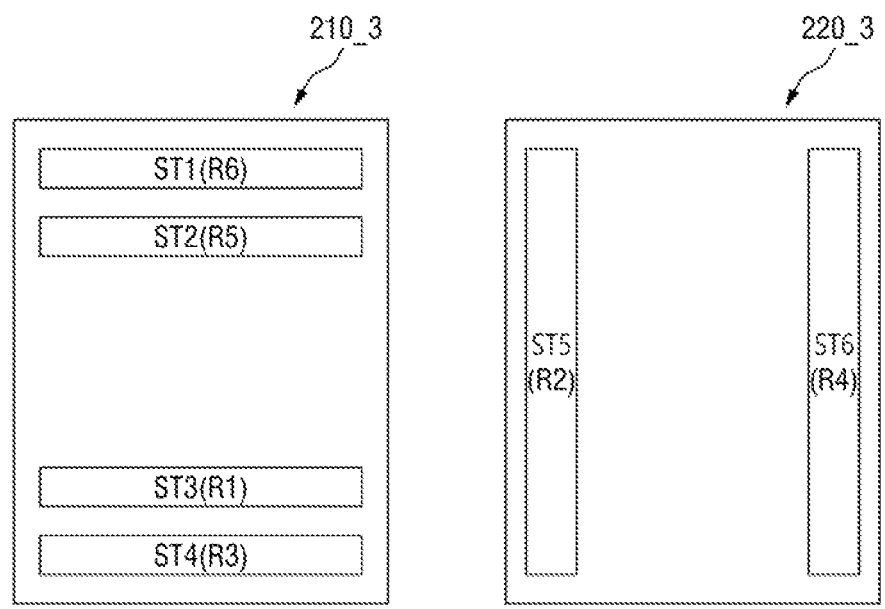
Figure 13:
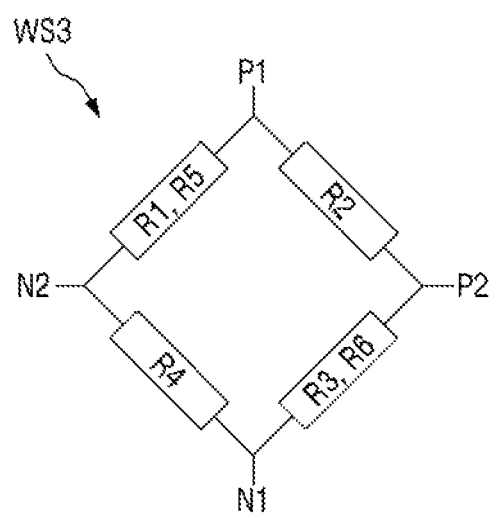

FIGS. 11 to 13 illustrate a method of sensing a touch pressure in a display device according to an embodiment of the present disclosure. A repeated description of components having been described with reference to FIGS. 1 to 8 will be omitted.

Referring to FIGS. 11 to 13, according to an embodiment, each of the fourth sensing electrodes IE4-1' to IE4-5' on the second substrate 220 include a plurality of fourth sensing units SE4 and a plurality of fourth connection units cp4. Here, the fourth sensing units SE4 are spaced apart along the first direction d1, and are connected to each other through the fourth connection units cp4.

According to an embodiment, the fourth sensing electrodes IE4-1' to IE4-5' are connected to the second touch pad unit DP2 through a plurality of fourth signal lines IL4-1 is IL4-5, respectively. Thus, the fourth sensing electrodes IE4-1' to IE4-5' receive driving signals from a touch driving circuit through the fourth signal lines IL4-1 to IL4-5 and the second touch pad unit DP2.

According to an embodiment, at least two of the fourth sensing electrodes IE4-1' to IE4-5' are connected to each other through connection electrodes. For example, the fourth sensing electrodes IE4-1' and IE4-2' disposed in different columns are directly connected to each other through a fourth connection electrode CE4. Accordingly, the fourth sensing electrodes IE4-1' and IE4-2' directly connected to each other through the fourth connection electrode CE4 form a strain gauge. Further, the fourth sensing electrodes IE4-' and IE4-5' axe directly connected to each other through a fifth connection electrode CE5. Accordingly, the fourth sensing electrodes IE4-4' and IE4-5' directly connected to each other through the fifth connection electrode CE5 form a strain gauge.

According to an embodiment, strain gauges are formed on the first substrate 210 and the second substrate 220, respectively. In an embodiment, the strain gauge formed on the first substrate 210 overlaps the strain gauge firmed on the second substrate 220. A third Wheatstone bridge circuit unit WS3 is formed from the respective strain gauges. This will be described with reference to FIGS. 12 and 13.

According to an embodiment, the first to fourth strain gauges ST1 to ST4 are formed on the first substrate 210_3. The fifth and sixth strain gauges ST5 and ST6 are formed on the second substrate 220_3. The first to sixth strain gauges ST1 to ST6 form the third Wheatstone bridge circuit unit WS3 shown in FIG. 13.

Here, according to an embodiment, the first to fourth strain gauges ST1 to ST4 intersect the fifth and sixth strain gauges ST5 and ST6. That is, the first to fourth strain gauges ST1 to ST4 intersect the fifth and sixth strain gauges ST5 and ST6 and have a relatively small resistance change, thereby further increasing a potential difference between the third power source N2 and the fourth power source P2. Thus, the accuracy of the touch pressure detection of the user can be improved.

As described above, according to embodiments of the present disclosure, it is possible to detect both touch position and touch pressure through one module.

The effects of embodiments of the present disclosure are not limited by the foregoing, and other various effects are anticipated herein.

Although exemplary embodiments of the present disclosure have been disclosed for illustrative purposes, those skilled in the art will appreciate that various modifications, additions and substitutions are possible, without departing from the scope and spirit of exemplary embodiments of the disclosure as disclosed in the accompanying claims.

What is claimed is:

1. A touch sensing device, comprising:
a first base layer;
a plurality of first sensing electrodes disposed on the first base layer that are spaced apart along a first direction;
a plurality of second sensing electrodes disposed on a same layer as the first sensing electrodes and arranged in different rows from the first sensing electrodes;
a plurality of third sensing electrodes disposed on the second sensing electrodes that are spaced apart along a second direction different from the first direction and that overlap the second sensing electrodes; and
a plurality of fourth sensing electrodes disposed on the first sensing electrodes that are spaced apart along the second direction and that overlap the first sensing electrodes,
wherein at least two of the second sensing electrodes are directly connected to each other.

2. The touch sensing device of claim 1, further comprising:
a Wheatstone bridge circuit unit electrically connected to a first strain gauge,
wherein the at least two directly connected second sensing electrodes form the first strain gauge.

3. The touch sensing device of claim 2, wherein
at least two fourth sensing electrodes in different columns from each other are directly connected to each other,
the at least two directly connected fourth sensing electrodes form a second strain gauge, and
the second strain gauge is electrically connected to the Wheatstone bridge circuit unit.

4. The touch sensing device of claim 3, wherein the first strain gauge overlaps the second strain gauge.

5. The touch sensing device of claim 1, wherein the fourth sensing electrodes are floating electrodes.

6. The touch sensing device of claim 1, wherein a ground voltage is transmitted to the third sensing electrodes in a touch pressure sensing mode.

7. The touch sensing device of claim 1, wherein the first sensing electrodes and the second sensing electrodes are alternately arranged along the first direction.

8. The touch sensing device of claim 1, further comprising:
a second base layer on which the third sensing, electrodes and the fourth sensing electrodes are disposed; and
an insulating layer disposed between the first base, layer and the second base layer and that covets the first sensing electrodes and the second sensing electrodes.

9. The touch sensing device of claim 8, further comprising
a first touch pad unit disposed on the first base layer and connected to the first sensing electrodes and the second sensing electrodes through a plurality of first sensing lines; and
a second touch pad unit disposed on the second base layer and connected to the third sensing electrodes and the fourth sensing electrodes through a plurality of second sensing lines.

10. A display device, comprising:
a display panel; and
a touch sensing panel disposed over the display panel,
wherein the touch sensing panel includes:
a plurality of first sensing electrodes spaced apart along a first direction;
a plurality of second sensing electrodes disposed on to same layer as the first sensing electrodes and arranged in different rows from the first sensing electrodes; and
a plurality of third sensing electrodes on the second sensing electrodes and spaced apart along a second direction different from the first direction and that overlap the second sensing electrodes,
wherein two of the second sensing electrodes are directly connected to each other and form a first strain gauge.

11. The display device of claim 10, wherein the touch sensing panel further includes a Wheatstone bridge circuit unit electrically connected to the first strain gauge.

12. The display device of claim 11, wherein
another two of the second sensing electrodes are directly connected to each other and form a second strain gauge, and
the second strain gauge is electrically connected to the Wheatstone bridge circuit unit.

13. The display device of claim 11, wherein the touch sensing panel further includes a plurality of fourth sensing electrodes on the first sensing electrodes that are spaced apart along the second direction and that overlap the first sensing electrodes.

14. The display device of claim 13, wherein
two fourth sensing electrodes are connected to each other and form a third strain gauge,
the third strain gauge is electrically connected to the Wheatstone bridge circuit unit, and
the first strain gauge overlaps the third strain gauge.

15. The display device of claim 13, wherein the fourth sensing electrodes are floating electrodes.

16. The display device of claim 10, wherein the first sensing electrodes and the second sensing electrodes are alternately arranged along the first direction.

17. The display device of claim 10, wherein the touch sensing panel further includes:
a first base layer disposed on the display panel and on which the first sensing electrodes and the second sensing electrodes are disposed;
a second base layer on which the third sensing electrodes are disposed; and
an insulating layer disposed between the first base layer and the second base layer and that covers the first sensing electrodes and the second sensing electrodes.

18. The display device of claim 17, wherein the touch sensing panel further includes:
a first touch pad unit disposed on the first base layer and connected to the first sensing electrodes and the second sensing electrodes through a plurality of first sensing lines; and
a second touch pad unit disposed on the second base layer and connected to the third sensing electrodes through a plurality of second sensing lines.

19. The display device of claim 10, wherein a ground voltage is transmitted to the third sensing electrodes in a touch pressure sensing mode.

20. A touch sensing device, comprising:
a plurality of first sensing electrodes disposed on a substrate that are spaced apart along a first direction;
a plurality of second sensing electrodes disposed on the substrate and arranged in different rows from the first sensing electrodes, wherein at least two of the second sensing electrodes are directly connected to each other and form a first strain gauge;
a plurality of third sensing electrodes on the second sensing electrodes that spaced apart along a second direction different from the first direction and that overlap the second sensing electrodes; and
a Wheatstone bridge circuit unit electrically connected to the first strain gauge.

* * * * *